Dec. 11, 1951  O. V. TILLBERG  2,578,109
VALVE WITH A VARIABLE RANGE OF REGULATION
Filed Jan. 9, 1946
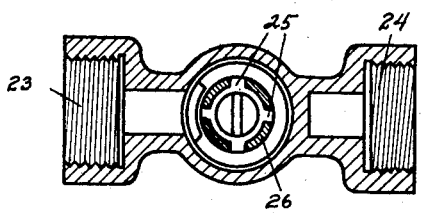
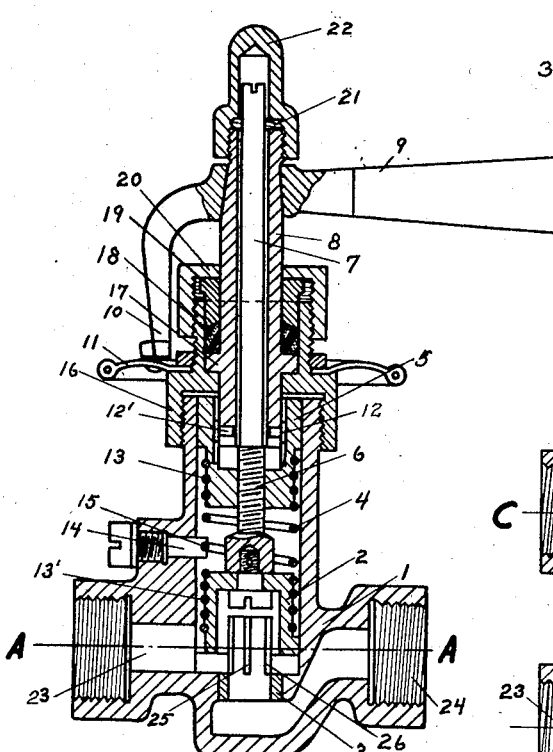
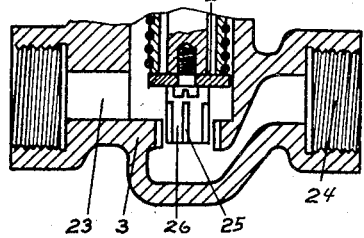
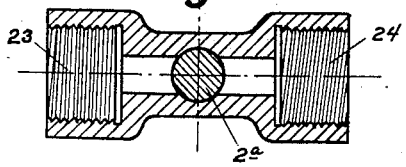
Inventor:
Olof Valfrid Tillberg,
By: Pierce, Scheffler & Parker,
Attorneys.

Patented Dec. 11, 1951

2,578,109

UNITED STATES PATENT OFFICE 2,578,109

VALVE WITH A VARIABLE RANGE OF REGULATION

Olof Valfrid Tillberg, Solna, Sweden

Application January 9, 1946, Serial No. 640,016
In Sweden December 16, 1944

Section 1, Public Law 690, August 8, 1946
Patent expires December 16, 1964

6 Claims. (Cl. 251—34)

This invention relates to a valve with a variable range of regulation for liquid or gaseous fluids, especially intended for the regulation of hot water to radiators and of hot air or the like to apparatus for air conditioning, in which the opening and closing motion of the regulating member is effected by operating a spindle provided with, for instance, a handle or a wheel and connected with the regulation member. The valves hitherto used for the purpose, especially for the regulation of radiators, have been adjustable from outside for different openings and thereby flows, but generally these valves have given a very imperfect regulation of the flow of the fluid as even a very small lifting movement of the closing member in the valve has caused such a large opening for the flow that there has scarcely existed in practice any real intermediate range between fully closed and fully open valve.

The principal object of the invention is to provide a new and improved valve construction in which the lifting height of the valve closing member and thereby its range of regulation for the flow through the valve can be varied from the outside of the valve casing also when the valve is in use. Another object is to provide an improved construction of the valve closing member permitting the same accuracy of the regulation of the flow through the valve as that with which the lifting height of the closing member can be controlled.

I attain this first object by providing the valve with a spiral or helical member, for instance a spring or the like, with a pitch that can be varied, and with a controlling or steering member in movable, preferably sliding, contact with one another and connected with the operating spindle of the valve, constituting also the valve closing member or being an extension of same, and with the valve casing in such a manner that on moving the valve closing member axially by turning the spindle, the valve closing member will be given a helical motion, conditioned by the motion of the spiral or helical member in relation to the steering member, in maintained contact between said members. In each case the lifting height of the valve closing member for a certain turning angle of the spindle is determined by the pitch adjusted in the spiral or helical member. According to a somewhat modified construction of the valve the helical member is connected with the valve casing instead of the valve closing member, and the steering member connected with the valve closure member instead of the valve casing. In both cases the same relative motion takes place between the helical member and the steering member in the valve, and the effect of these members on the motion of the valve closing member is the same, when the spindle is operated for opening and closing the valve.

The accompanying drawings illustrate two embodiments of the invention, to which, however, the invention is not bound, since they constitute examples only of how the invention may be carried out. In Figures 1, 2, and 3 there is shown a valve in which the spiral or helical member in the form of a helical spring is connected to the valve closing member and the controlling or steering member is connected to the valve casing, while in Figures 4, 5, and 6 is shown a valve in which the spiral or helical member in the form of a flat metal helical spring is connected to the valve casing and the steering member to the valve closing member. Fig. 1 is a vertical section through the valve according to the first-mentioned embodiment, Fig. 2 is a section at right angles to the former on the line A—A in Fig. 1, and Fig. 3 shows another construction of the closing member of the valve. Fig. 4 is a vertical section through the valve according to the second embodiment, Fig. 5 is a part of another vertical section at right angles to the former on the line B—B in Fig. 4, and Fig. 6 is a horizontal section through the valve at right angles to the former on line C—C in Fig. 5. Like characters of reference denote like or corresponding parts in the several figures.

In Fig. 1, 1 represents the valve casing, 2 the valve closing member at the same time serving as regulating member, and 3 the valve seat, against which the closing member tightens. The closing member 2 is through a spiral or helical member 4, in this case consisting of a helical spring formed by a thread, connected with an extender 5 placed in the valve casing, which extender by means of a screw-thread 6 is connected to an adjusting spindle 7, freely movable within the real valve spindle 8 for the motion of the closing member. On the valve spindle is placed a handle 9 with a pointer 10, by which the valve is opened and closed and further the opening of the valve is regulated. For showing the position of the valve closing member there is placed under the pointer 10 a plate 11 or the like with figures along the circumference in the usual manner. The valve spindle is fixed in the extender 5 by means of ribs 12 and slots 12', so that the extender can be displaced in the longitudinal direction of the spindle along the ribs 12 on the spindle. The helical compressible and extendible member 4 is placed in helical slots 13' and 13 in the closing member 2 and in the extender 5, respectively, for instance with the same pitch as the member 4 in its normal position. If the number of the screw-thread slots 13' and 13 in the closing member 2 and the extender 5 is sufficiently great, for example 3 or 4, the helical spring 4 may be kept in same solely by friction and transfer enough power between them for their simultaneous motion. The helical spring 4, which may also have some other section than round, for instance rectangular or quadratic, and be made of metal or other suitable material, and also be fastened to the closing member 2 and to the extender 5 in other ways, for instance by means of pins, by riveting or the like, though adherence by friction is shown in Fig. 1. The wall of the valve casing 1 is pierced by a fixed but adjustable steering member 14, in this case carried out as a pin threaded into the wall, for the part of the spring 4 that is placed between the closing member and the extender and grasping the spiral thread or the like by the fork-shaped inner end 15.

On operating the handle 9 and by it the spindle 8 the extender 5 will turn the closing member 2 by the aid of the spring 4, when these three parts together will turn upwards or downwards in a helical manner, depending upon the turning direction of the handle 9, coercively steered by the pin 14. The lifting height of the valve may be adjusted to a suitable number of turns of the handle 9 and thereby to the number of windings in the helical spring but also to one turn or part of one turn only of the handle, for instance 270° to 320° for a full opening of the valve. The latter is suitable when the valve is used, for instance, for regulating the water flow in radiators. The helical spring 4, which in Figures 1 and 2 is shown with a great number of windings, may also be carried out with one winding only or part of such a one.

By rotating the inner adjusting spindle 7 by the aid of a screw driver or the like while holding fast the handle 9, the extender 5 will owing to the screw thread move upwards or downwards along the ribs 12 in relation to the valve spindle 8, whereby the spring 4 between the extender 5 and the closing member 2 will be lengthened or shortened, and thereby the pitch of the spring will be changed in this part. Hereby the lifting height of the closing member 2 in relation to the valve seat 3 will also be changed for a certain number of revolutions or a certain part of one revolution of the spindle 7. Thus it is possible to regulate at wish from outside the maximal size of the opening for the flow in the valve by rotating the adjusting spindle 7.

In this case the valve casing 1 is closed at the top around the spindles by a tightening coupling-box 16, in which the valve spindle 8 has its bearing by an enlargement or a ring 17 on the spindle, over which tightening is obtained by a packing 18 and a gland 19 that is pressed against the packing by a stuffing-nut 20. Over the adjusting spindle 7 is placed a screw-cap 22, which is screwed away when the upper end of the adjusting spindle 7 is to be made accessible for rotating the spindle.

In order to make the regulation range of the valve still greater and render a more accurate regulation by the same possible than is obtainable by a common disc valve or a cock, there is shown in Fig. 1 a special accomplishment of the connection between the inlet-side 23 and the outlet-side 24 of the valve casing 1 that is regulated by the closing member 2. In this case there is placed in the valve seat 3 a part 26 with openings 25 and with cylindrical or conical shape. Suitably the openings 25 may be made as lengthened slots or the like with the width and the number adapted to the requirements for each special purpose. In Fig. 2 showing a section through the inlet and outlet parts of the valve, the number of openings is chosen four. The part 26 may, however, be arranged as a lower part of the closing member 2 itself, as shown in Fig. 3. The part 26 may further be formed by beans or the like running out from the valve seat 3 or from the closing member 2 with intermediate spaces forming the openings 25. Because of the total free opening in the valve in this way becoming relatively small, a comparatively great lifting height of the closing member can be used, and thereby a more accurate regulation of the flow through the valve is obtained when the closing member is moved.

In Figures 4 to 6 which show a second embodiment of the invention, in this case of a somewhat simplified construction in comparison with the embodiment in Figures 1 to 2, the spiral or helical member 4a is connected at the upper end to the extender 5a by means of the engagement of the looped end around a pin 34 and at the lower end to the valve casing 1a around a screw plug 31 sticking into the same. Here the steering member consists of a pin 14a screwed into the closing member 2a, which in this case is carried out as a direct extension of the valve spindle 8a, which pin in its outer end 15a is fork-shaped and embraces the helical member 4a consisting of a flat metal spring. Extender 5a is connected with casing cap 33 by threads 6. Casing cap 33 corresponds to adjusting spindle 7 in Figure 1 and is provided with flange 35 engaging the valve casing. Coupling ring 16a is provided for maintaining casing cap 33 in position. A gland nut 19a and packing 18a prevent leakage around the spindle 8a. In this case the position of the extender 5a and thereby the lifting height of the valve closing member 2a is adjusted by unscrewing a lock-nut 32, whereupon the cap 33, which is made with a hexagonal skull, is rotated by means of a screw-key while securing the handle 9a. The pitch of the helical member 4a will now be changed corresponding to the change in the position of the extender 5a in the valve casing 1a.

The advantages of the valve according to the invention are without further comments clear from the above mentioned. Through the helical member 4 with the appertaining steering member 14 the lifting height of the valve closing member can thus be adjusted at wish, and thereby the range of regulation of the valve be varied. By means of the connection part 26 with its lengthened openings 25 between the inlet and outlet sides of the valve a more accurate regulation of the opening for the flow can be obtained in operating the valve than is else the case, when even at a small lifting of the closing member a practically full flow will arise.

Evidently the construction of the valve may be varied considerably in comparison with the embodiments described and shown without departing from the scope of the invention, if only the principles of the valve mentioned are applied.

Having described my invention, what I claim and desire to secure by Letters Patent is:

1. A valve with a variable range of regulation comprising, a casing with a valve seat, a rotatable closing member within the casing movable axially to and from engagement with the valve seat, a rotatable spindle connected with said closing member for operating the same, an extender coaxial with the spindle and adjustable axially with respect thereto, an adjusting member coaxial with the extender and in threaded engagement therewith for changing from outside the casing the position of said extender axially in relation to said closing member and thereby also in relation to the valve seat, a compressible and extensible helical member coaxial with said closing member and fixed at one end to said extender and at its other end to a part of the valve in relation to which said extender is movable so as to adjust the pitch of the helical member by axial adjustment of the position of said extender, and a steering member fixed in another part of the valve in relation to which said extender is axially movable, one of said parts of the valve in relation to which said extender is axially movable being a fixed part of the casing and the other of said parts being the closing member, said steering member having a guide portion in sliding engagement with said helical member for effecting axial movement of the valve closing member upon turning motion of said spindle to cause relative rotary motion between said steering member and said helical member.

2. A valve with a variable lifting height comprising, a casing with a valve seat, a closing member within the casing and movable axially in relation to the valve seat, a rotatable operating spindle connected with said closing member for operating same, an extender coaxial with the spindle and adjustable axially with respect thereto, an adjusting member coaxial with respect to the extender and in threaded engagement therewith for changing from outside the casing the axial position of said extender on said spindle and thereby also relatively to the valve seat, a compressible and extendible helical spring attached at one end to said extender and at its other end to the closing member so as to make its pitch and thereby the lifting height of the closing member for a certain turning angle of the regulating spindle adjustable by changing the axial position of the extender, and a steering member for said helical spring secured to the valve casing, said spring being slidingly engaged with said steering member for controlling the movement of the valve closing member upon turning movement of said operating spindle.

3. A valve with a variable lifting height comprising, a casing with a valve seat, a closing member within the casing and movable axially in relation to the valve seat, a rotatable operating spindle secured to said closing member for operating same, an extender coaxial with the spindle and adjustable axially with respect thereto, an adjusting member coaxial with respect to the extender and in threaded engagement therewith for changing from outside the casing the axial position of said extender on said spindle and thereby also relatively to the valve seat, a compressible and extendible helical spring attached at one end to said extender and at its other end to the casing so as to make its pitch and thereby the lifting height of the closing member for a certain turning angle of the operating spindle adjustable by changing the axial position of the extender, and a steering member for said spring secured to said regulating spindle, said spring slidingly engaging said steering member for controlling the movement of the closing member upon turning movement of the operating spindle.

4. A valve as claimed in claim 1, wherein the helical member consists of a flat metal spring disposed with its greatest breadth radially to the axis of turning of the operating spindle, and the spring is bent at its ends to form loops placed around screw-pins fixed in the extender and part of the valve to which the other end is fixed, respectively, so as to make the spring slightly movable at its points of attachment.

5. In a valve of the character disclosed, a casing with a valve seat, a closing member within the casing and movable axially in relation to the valve seat, a rotatable operating spindle secured to said closing member for operating same, an extender concentric with and movable along said operating spindle and having a rib and slot connection thereto, a rotatable adjusting member coaxial with and threadedly engaging said extender for changing from outside the casing the axial position of said extender in relation to the valve seat, a compressible and extendible helical spring coaxial with said closing member, a steering member for said helical spring fixed in said casing and having sliding contact with said spring, the spring being attached at one end to said extender and at its other end to said closing member, the pitch of said spring and thereby the lifting height of said closing member for a certain turning angle of the operating spindle being adjustable by changing the position of said extender in relation to the valve seat by rotation of said adjusting member.

6. In a valve of the character disclosed, a closing member within the casing and movable axially in relation to the valve seat, a rotatable operating spindle for said closing member, an extender coaxial with and movable solely axially along said spindle, a rotatable adjusting member coaxial with and having threaded engagement with said extender for changing and fixing the axial position of said extender on said spindle, a helical spring attached at its ends in a slightly movable manner to the extender and to another part of the valve, respectively, so as to be extended or compressed by changing the position of said extender, a steering member fastened in a part of the valve in relation to which the extender is axially movable, said steering member being in sliding contact with said spring for controlling the movement of said closing member upon rotation of said spindle.

OLOF VALFRID TILLBERG.

REFERENCES CITED

The following references are of record in the file of this patent:

FOREIGN PATENTS

| Number | Country | Date |
|---|---|---|
| 177 | Great Britain | of 1893 |
| 99,317 | Germany | of 1898 |